April 3, 1945.  R. H. PHELPS  2,372,849
AUTOMOTIVE SUSPENSION
Filed July 15, 1940   2 Sheets-Sheet 1

INVENTOR.
ROSS H. PHELPS
BY Carl J. Barbee
his Attorney

April 3, 1945. R. H. PHELPS 2,372,849
AUTOMOTIVE SUSPENSION
Filed July 15, 1940 2 Sheets-Sheet 2
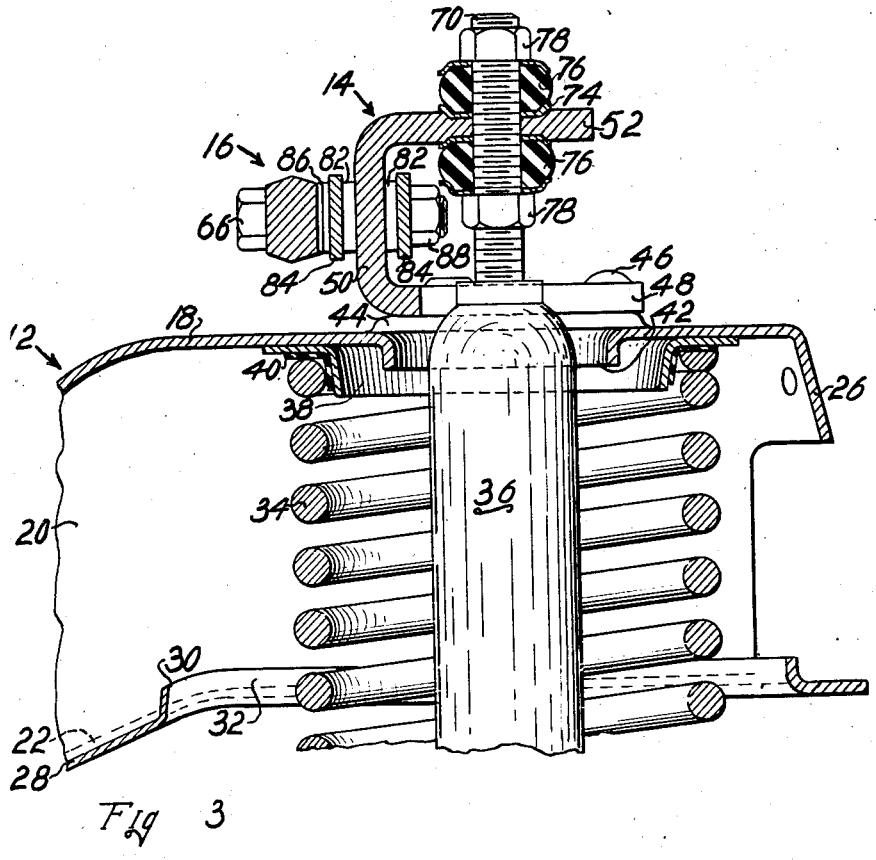
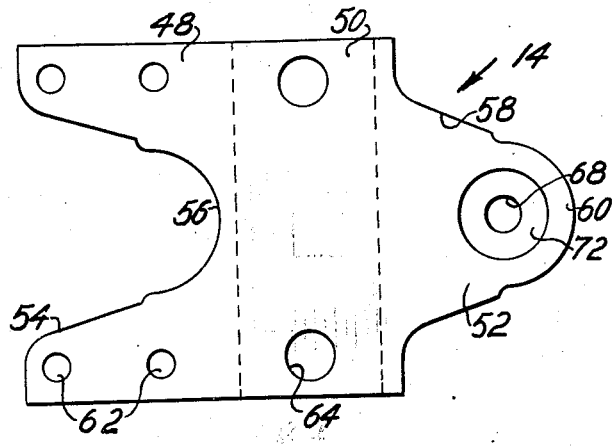
INVENTOR.
ROSS H. PHELPS Patented Apr. 3, 1945

2,372,849

UNITED STATES PATENT OFFICE 2,372,849

AUTOMOTIVE SUSPENSION

Ross H. Phelps, Kenosha, Wis., assignor to Nash-Kelvinator Corporation, Kenosha, Wis., a corporation of Maryland Application July 15, 1940, Serial No. 345,575

9 Claims. (Cl. 267—20)

This invention relates to automotive suspension and has particular reference to means for mounting the upper control arm and the shock absorber of a parallel arm type of independent wheel suspension.

It is an object of this invention to provide means for mounting an upper control arm which will reduce the cost of the frame member supporting the control arm.

It is another object of this invention to provide novel means for supporting an upper control arm which will insulate the control arm from the frame.

It is another object of this invention to provide a novel bracket for supporting an upper control arm, which bracket may be inexpensively manufactured without creating waste material.

It is another object of this invention to provide a bracket for supporting an upper control arm and a shock absorber.

Other objects and advantages of this invention will be apparent from a consideration of the following description and attached claims and drawings of which there are two sheets and in which—

Figure 3 represents a sectional view taken along a plane indicated by the line 3—3 in Figure 1 and looking in the direction of the arrows;

Figure 4 represents a developed or plan view of a stamping from which the bracket shown in Figures 1, 2 and 3 is manufactured.

Figure 1:
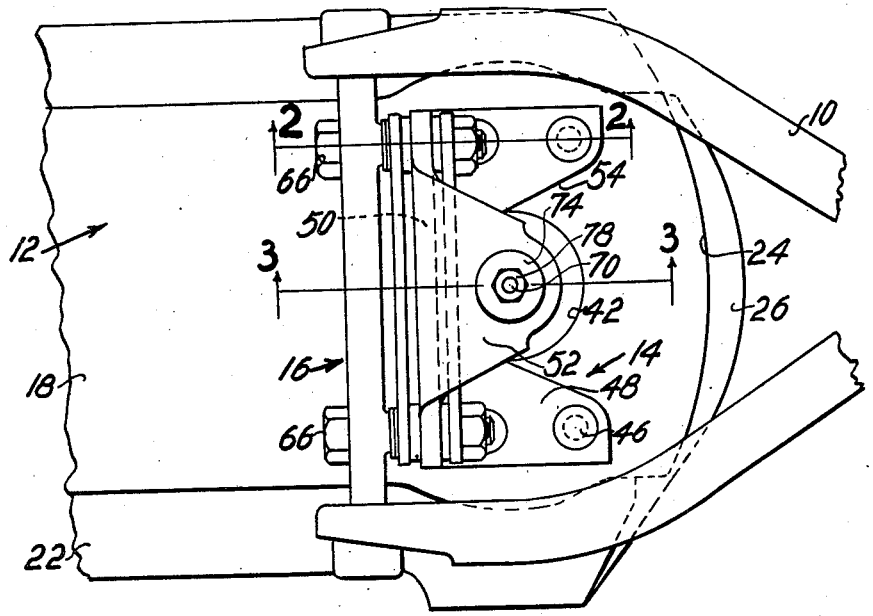
Figure 1 represents a plan view of the end of a front cross member of an automobile frame with an upper control arm and shock absorber mounted thereon.

Parallel arm types of suspension in which a steering knuckle support arm is connected at its ends to upper and lower control arms pivoted on a frame are well known in the automotive art, and so the complete suspension is not illustrated in the drawings.

This invention deals with means for mounting the upper control arm illustrated at 10 to the front cross member 12. Generally, the mounting consists of a bracket 14 secured to the cross member 12 and a pivot bar 16 supported by the bracket. The legs of the control arm 10 are pivoted on the ends of the pivot bar 16 in a manner which is more particularly described and claimed in my co-pending application, Serial No. 335,988, for Automotive suspension, filed May 18, 1940.

More specifically, the cross member 12 consists of a downwardly opening trough-shaped stamping having a top web 18, side walls 20, from the bottom edges of which flanges 22 are turned outwardly. The end of the cross member is rounded as at 24 and the web portion 18 is turned downwardly at 26 along the curved end and arranged to fit within, and be secured to, a side rail member (not shown) of the automobile frame. Secured to the flanges 22, as by welding, and closing the open side of the cross member 12 is a reinforcing plate 28. Near the end of plate 28, an annular flange 30 is stamped upwardly defining an aperture 32 through which extends a coil spring 34 and strut type shock absorber 36. Secured to the under side of the web portion 18 is a downwardly flanged annular ring 38 which serves to center the spring 34 in the cross member 12. A flanged annular washer 40 of fibrous or other sound deadening material is positioned between the spring 34 and the flanged ring 38 to prevent the transmission of noise from the spring to the cross member.

Figure 2:
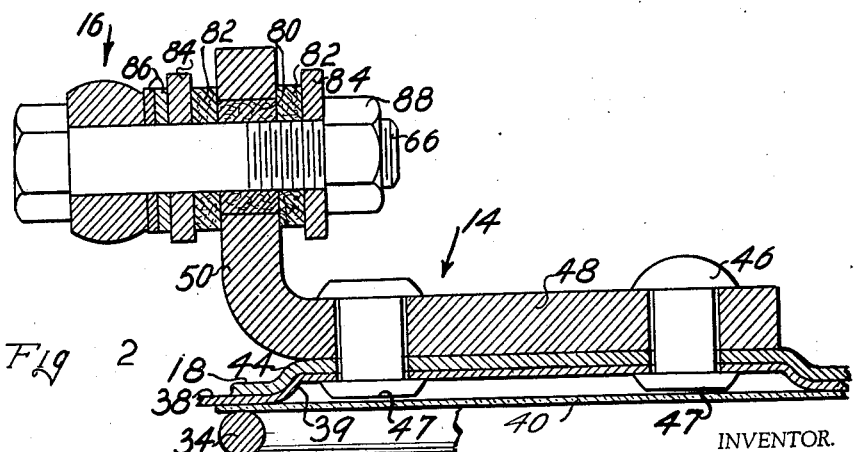
Figure 2 represents a sectional view taken along a plane indicated by the line 2—2 in Figure 1 and looking in the direction of the arrows.

The upper webbed portion 18 of the cross member 12 is stamped downwardly in a flanged aperture 42 which is concentrically located within the flanged annular ring 38. On each side of the opening 42 the webbed portion 18 is stamped upwardly to form lands 44 (see Figures 2 and 3). Secured to the lands 44 by rivets 46 are the bases 48 of the bracket 14. Rivets 46 are passed through the base of the bracket 14, through the lands 44 and the flat portion of the annular ring 38 is stamped upwardly as at 39 (see Figure 2) so as to fit on the under side of the lands 44. The bottom head of the rivets 46 are flattened as at 47 so that the spring 34 will clear them.

The bracket 14 consists of a heavy metal stamping, from the base 48 of which extends a vertical wall 50 and a top wall 52 which is bent over parallel to the base 48. The base 48 is notched as at 54 with a semi-circular end portion 56 and the top wall 52 is wedge-shaped as at 58 with a semi-circular end 60 in such a manner that in stamping the blanks for the brackets 14, the upper wall of one bracket cuts out a block of metal leaving a space which forms the notch 54 of the next bracket in stock. In this manner there is no wasted metal in stamping a series of the brackets from a plate of stock which is the correct width. The blank is apertured as at 62 to pass the rivets 46 and at 64 to pass bolts 66 for securing the pivot bar 16 to the bracket and at 68 to pass the bayonet end 70 of the shock absorber 36. Both sides of the top wall 52 are indented in an annular ring 72 around the aperture 68 to center cup-shaped washers 74. The apertures 62, 64 and 68, and the indentions 72 may conveniently be stamped from the blank while it is being cut and before it is bent into its final shape.

Shock absorber 36 extends upwardly through the center of spring 34 and through flanged opening 42 in the top wall of the cross member. The semi-circular notch 56 in the base 48 of the bracket 14 provides clearance for the top of the shock absorber, while the bayonet end 70 is extended upwardly through the aperture 68 in the top wall 52. Rubber biscuits 76 are positioned on each side of the top wall 52 and around the bayonet end 70.

Positioned in each of the apertures 64 and around the bolts 66 is a short cylinder 80 formed of fibrous or other sound deadening material. Carried around the bolts 66 on each side of the cylinder 80 are washers 82 made of the same material as the cylinder 80. Metal bars 84 are apertured at each end and have the bolts 66 passed through them. Bars 84 face against the washers 82 and protect them from wear. Positioned between the inner bar 84 and the pivot bar 16 are a pair of metal shims 86. The thickness of shims 86 may be changed to alter the caster and camber setting of the suspension in a manner which is more particularly described and claimed in my above mentioned application Serial No. 335,988. The pivot bar, shims, fibrous washer and metal bars 84 are drawn down tight against the bracket 14 by means of nuts 88 threaded on the ends of bolts 66.

The above described construction insulates the upper control arm from the cross member 12 and provides a single member (the bracket) which supports both the pivot bar and the shock absorber. The bracket permits the use of a longer shock absorber 36 and is easily and cheaply constructed as has been explained above. The use of the bracket 14 permits the cross member 12 to be a simple shape which may be easily formed by stamping. No complicated shapes are required to be stamped into the cross member. Attention is also called to the fact that the shape of the bracket 14 not only allows the shock absorber 36 to project upwardly through the bracket, but also permits the bracket to be easily riveted to the cross member since the rivets 46 are not covered by the wedge-shaped top portion 52 of the bracket.

While I have described my invention in some detail, I intend this description to be an example only and not as a limitation of my invention to which I make the following claims.

I claim:

1. In an automotive suspension, a U-shaped bracket of folded metal construction for supporting a control arm compriisng a flat base portion and a flat top portion spaced from and maintained parallel to said base portion by an intermediate portion, said top portion being cut away from over the sides of said base portion, and a pivot member for said control arm yieldingly secured to said intermediate portion.

2. In an automotive suspension, a bracket of folded metal construction for supporting a control arm comprising a base portion, a generally vertical side portion, a top portion spaced from said base portion, and a pivot bar non-rotatably secured to said side portion.

3. In an automotive suspension, a bracket for supporting a control arm comprising a base portion, a generally vertical side portion, a top portion spaced from said base portion, a pivot bar having bolts extending therethrough to secure said pivot bar to said side portion, and sound deadening material positioned around said bolts between said bolts and said bracket and between said bracket and said pivot bar.

4. In an automotive suspension, a bracket of folded metal construction for supporting a control arm comprising a notched base portion, a generally vertical side portion, a top portion spaced over said base portion, a pivot bar bolted to said side portion, and a strut type shock absorber secured to said top portion and extending through said notched base portion.

5. In an automotive suspension, a bracket of folded metal construction for supporting a control arm comprising a notched end portion, a wedge-shaped end portion, said wedge-shaped portion being bent over said notched end portion, a pivot bar bolted to said bracket between said end portions, and a strut type shock absorber secured to said wedge-shaped portion and extending through said notched portion.

6. In an automotive suspension, a bracket for supporting a control arm comprising a notched end portion, a wedge-shaped end portion, said wedge-shaped portion being bent over said notched end portion, a pivot bar bolted to said bracket between said end portions, and a strut type shock absorber secured to said wedge-shaped portion and extending through said notched portion, said wedge-shaped end of said bracket having the same outline as the notch in the other end of said bracket.

7. In an automotive suspension, a cross member defining a downwardly flanged aperture, a bracket having a flat base riveted to said cross member on each side of said aperture and defining a notch uncovering said aperture, a flat wedge-shaped top portion spaced above said base portion and extending over said aperture, a pivot bar secured to said bracket by bolts extending through said bar and said bracket between said base and top portion, and a shock absorber extending through said notched portion and attached to said wedge-shaped portion, said wedge-shaped portion being recessed on each side thereof to seat a washer.

8. In combination, a rigid cross member having a channel-shaped cross section, the web of said cross member defining an aperture, a bracket of folded metal construction having a flat base secured to said cross member, said base being cut away around said aperture, a flat top portion formed on said bracket and spaced above said base portion, said top portion being cut away from over the edges of said base portion, and rivets passed through said cross member and the edges of said base portion.

9. In an automotive suspension, a cross member having lands pressed upwardly from its end and defining a hole at its end, a bracket having a notched base positioned on said lands, an annular flanged ring having portions stamped to fit under said lands positioned under the end of said cross member and around said aperture, rivets passed through said ring, cross member and base of said bracket, the bottom head of said rivets being flattened to fit within the upwardly stamped portion of said annular ring, and wheel supporting mechanism secured to said bracket, said mechanism including a strut type shock absorber extending through said ring and aperture.

ROSS H. PHELPS.